Aug. 7, 1956   G. WEISSENBERG ET AL   2,757,840
METHOD OF AND APPARATUS FOR EVACUATING VESSELS
Filed July 8, 1953
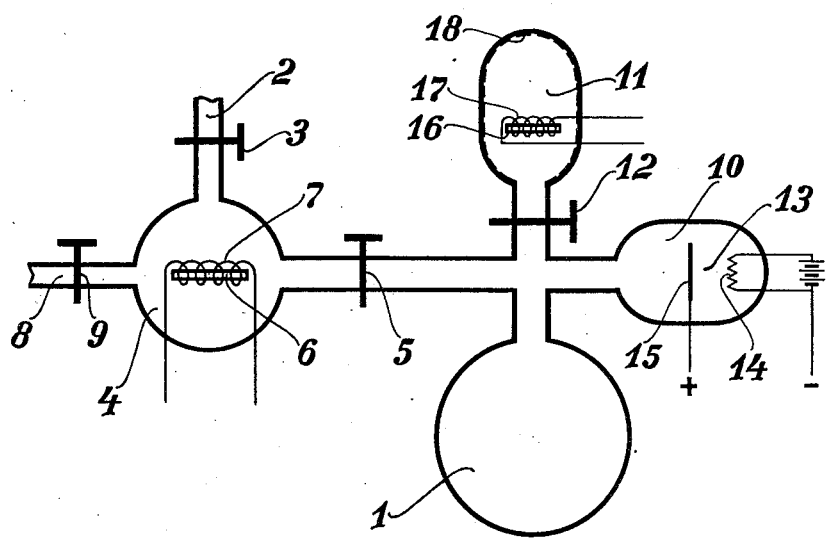
INVENTORS:
GUSTAV WEISSENBERG
DANKMAR TAUERN
BY
Richardson, David and Vordon
Att'ys

United States Patent Office 2,757,840
Patented Aug. 7, 1956

2,757,840

METHOD OF AND APPARATUS FOR EVACUATING VESSELS

Gustav Weissenberg, Marburg (Lahn), and Dankmar Tauern, Wetzlar (Lahn), Germany, assignors to Ernst Leitz, G. m. b. H., Wetzlar, Germany Application July 8, 1953, Serial No. 366,771

Claims priority, application Germany July 18, 1952

12 Claims. (Cl. 226—20.1)

This invention relates to a new and improved method of and apparatus for evacuating vessels by the adsorption or absorption of the gas contained therein.

In the field of vacuum technology it is generally known to produce a vacuum by means of mechanical pumps, molecular kinetic pumps and jet pumps. When it is desired to produce pressures of a magnitude of $10^{-3}$ mm. Hg or less, it is necessary to resort to so-called "preliminary" or "fore pumps" in addition to the high-pressure pumps used. These systems are, however, relatively expensive and difficult to manipulate. It is also known to evacuate a vessel by adsorption, using, for instance, coal or silica gels, but in carrying out these processes, it is necessary to deep-freeze the adsorbents by means of carbon dioxide snow or liquified air. In these processes, the speed of evacuation is low. Moreover, the procurement of the freezing agent is usually connected with considerable difficulties.

The method according to the present invention avoids these disadvantages yet produces a vacuum whose final pressure may be smaller than $10^{-3}$ mm. Hg or Torr. According to the invention single or repeated absorption of gas takes place, with the use of an absorbent which, in a reversible process, absorbs or desorbs the gas contained in a vessel. In carrying out the new method, the vessel to be exhausted and the vessel containing the adsorbent are interconnected only during the adsorption phase, whereas they are disconnected during the desorption phase, when the liberated gas is exhausted. It is possible to improve the vacuum by reducing, prior to absorption, the pressure in the vessel to be evacuated, or in the vessel in which the absorbent is located, to approximately 20 to 12 mm. Hg. This result may be obtained, for instance, by means of a water jet pump in known manner.

A further improvement in the final vacuum can be obtained, by combining the new method above described with a "getter" arrangement and/or gas discharge in a gas ionization chamber connected to the vessel to be evacuated. According to the present invention, the vessel containing the "getters" is preferably separated from the vessel to be evacuated by means of a valve. Owing to this construction it is possible, without opening the "getter" vessel, to make repeated use of a "getter" layer and to apply a fresh "getter" layer over a worn-out layer by evaporation of "getter" material, e. g., barium, which is provided in the "getter" vessel in quantities sufficient for the formation of several layers.

An embodiment of the invention adapted to carry out the new method of evacuation is illustrated, by way of example, in the accompanying drawing in which reference numeral 1 designates the vessel to be evacuated. Vessel 1 communicates with conduit 2 which leads to a container of hydrogen (not shown). The latter may be disconnected from the system by means of valve 3. Chamber 4, which may be disconnected from vessel 1 by means of valve 5, encloses tray 6 containing for instance metallic titanium powder which may be heated by means of the heating coil 7. Conduit 8, which is provided with shut-off valve 9, leads from chamber 4 to a water jet pump (not shown). A gas discharge path 13, consisting of the cathode 14 and the anode 15 is provided for in chamber 10 which likewise communicates with vessel 1. In chamber 11, which also communicates with vessel 1 from which it may be disconnected by means of valve 12, there is provided for the "getter" arrangement, consisting of the tray 16 containing for instance metallic barium which may be evaporated by means of the heating coil 17 and of the active "getter" layer 18.

The method according to the present invention may be carried out in the following manner for example:

The entire system is thoroughly flushed with hydrogen, with or without the aid of a water jet pump, until practically all gases other than hydrogen have been removed. Then valve 3 is closed and the hydrogen is exhausted through conduit 8, by means of the water jet pump, until the pressure drops to about 20 to 12 mm. Hg. Valve 9 is then closed and the titanium powder on the tray 6 is heated by means of the heating coil 7 to a temperature of about 350° to 550° C. whereby, apart from a relatively small residual pressure, most of the hydrogen is absorbed by the titanium. The speed of absorption is so great that in a system having a total volume of about 2 litres, 2 grams of titanium metal absorb such a quantity of hydrogen, that the hydrogen pressure drops to about $10^{-3}$ mm. Hg within seconds. After closing valve 5, the titanium is heated to a temperature of about 800° to 900° C., whereby hydrogen is liberated which, after opening of valve 9, can again be exhausted by means of the water jet pump down to a pressure of about 20 to 12 mm. Hg. This method may be repeated, as desired, either to improve a vacuum previously produced or to produce a new vacuum.

The intensity of the final vacuum may be further improved by means of additional gas ionization and/or "getters," in a manner known by itself.

In addition to titanium other absorbents (adsorbents) such as for instance palladium, vanadium and zircon, etc., may be used and in the following claims the terms "absorb," "absorbent" and "absorption" are used broadly to include the meaning of "adsorb," "adsorbent" and "adsorption," respectively. Alternatively, the absorbent material may comprise a combination of at least two of said substances having different absorption and desorption ranges, whereby the production of the vacuum may be further controlled by the supplemental absorption and desorption of the respective substances. Similarly, other gases besides hydrogen may be used to advantage in carrying out the new method of evacuation described above. With respect to the new apparatus shown and described herein, it will be clear that the number of chambers or vessels 1, 4, 10 and 11 may be increased or decreased to fit individual requirements, although best results are obtained with not less than two such chambers.

We are aware of the fact that the construction and method of operation according to this invention may be modified in various respects without departing from the scope and spirit of this invention and we do not wish to be understood as limiting ourselves to the details set forth above except as specifically recited in the appended claims.

We claim:

1. Method of evacuating a closed multi-chambered vessel containing a gas, comprising the steps of placing inside the first chamber a substance capable of absorbing and desorbing said gas, causing gas absorption by said substance to lower the pressure in said chambers, closing said first chamber against the rest of the vessel, causing gas desorption in said first chamber, exhausting the gas in the latter, and reestablishing connection between said chambers.

2. The method claimed in claim 1, comprising the step of placing getter material into a third chamber provided in said vessel in an amount sufficient to form a plurality of layers on the inside wall of said third chamber, closing off said third chamber, causing a layer of getters to form on its inside wall, continuing the evacuation process until said getter layer is worn out, thereupon closing off said third chamber and causing re-deposition of a new getter layer, and reconnecting said third chamber, whereby redeposit of successive getter layers is accomplished without interruption of the evacuating process and without the need of dismantling the third chamber.

3. Method of evacuating a gas from a vessel having a chamber connected thereto, comprising the steps of placing inside said chamber a substance capable of absorbing and desorbing gas, closing said vessel and chamber against the outer atmosphere, causing said substance to absorb gas, disconnecting said chamber from said vessel, causing said substance to desorb, exhausting said chamber to the outside, closing said chamber to the outside after exhaustion thereof, and re-connecting said vessel and chamber and continuing the operation until the desired vacuum is obtained.

4. The method claimed in claim 3, in which the gas originally contained in said vessel is flushed out and displaced by a predetermined gas, prior to the absorption step; and in which said substance is of a type capable of absorbing and desorbing the said predetermined gas.

5. The method claimed in claim 3, in which said gas is hydrogen and said substance is selected from the group consisting of titanium, palladium, vanadium and zircon.

6. The method claimed in claim 3, in which said substance represents a combination of at least two substances whose absorption and desorption ranges differ, whereby the production of the vacuum can be additionally controlled by the supplemental absorption and desorption of the respective substances.

7. The method claimed in claim 3, in which the pressure in said vessel is reduced to about 20 to 12 mm. Hg prior to the gas absorption step.

8. In a system of gas evacuation, a closed vessel to be evacuated, a closed chamber communicating with said vessel, a substance disposed in said chamber, said substance being capable of absorbing and desorbing gas contained in said vessel and chamber, heating means disposed within said chamber for activating said absorbing substance, and valve means associated with said vessel and chamber for establishing and interrupting communication between vessel and said chamber and between the latter and the outside.

9. In a system of gas evacuation, a closed vessel to be evacuated, a closed chamber communicating with said vessel and provided with an outlet, a substance disposed in said chamber, said substance being capable of absorbing and desorbing gas contained in said vessel and chamber, heating means disposed within said chamber for activating said absorbing substance, pump means communicating with said chamber, first valve means controlling communication between said vessel and said chamber, second valve means controlling communication between said chamber and the outside, and third valve means controlling communication between said chamber and said pump means.

10. The system claimed in claim 9, including second pump means connected to the outlet of said chamber.

11. In a system of gas evacuation, a closed vessel to be evacuated, a closed first chamber communicating with said vessel, a substance disposed in said first chamber, said substance being capable of absorbing and desorbing gas contained in said vessel and first chamber, valve means associated with the said vessel and first chamber for establishing and interrupting communication between said vessel and said first chamber and between the latter and the outside, and a second chamber intercommunicating with said vessel and said first chamber, and a layer of getter material provided on the inside wall of said second chamber.

12. The system claimed in claim 11, in which additional getter material is disposed inside said second chamber, and including fourth valve means to connect said second chamber to and disconnect it from the said vessel and said first chamber, and means for activating said additional getter material whereby additional getter layers may be readily provided on the inside wall of said second chamber by evaporation of said additional getter material.

References Cited in the file of this patent

UNITED STATES PATENTS

| 815,942 | Dewar | Mar. 27, 1906 |
| 1,124,555 | Thatcher | Jan. 12, 1915 |
| 1,587,321 | Hunter | June 1, 1926 |
| 2,160,863 | Hickman | June 6, 1939 |
| 2,540,647 | Bienfait | Feb. 6, 1951 |
| 2,574,820 | Feuer | Nov. 13, 1951 |